Sept. 22, 1936.  C. W. WEISS  2,055,421
UNIVERSAL JOINT
Filed May 2, 1934  2 Sheets-Sheet 1
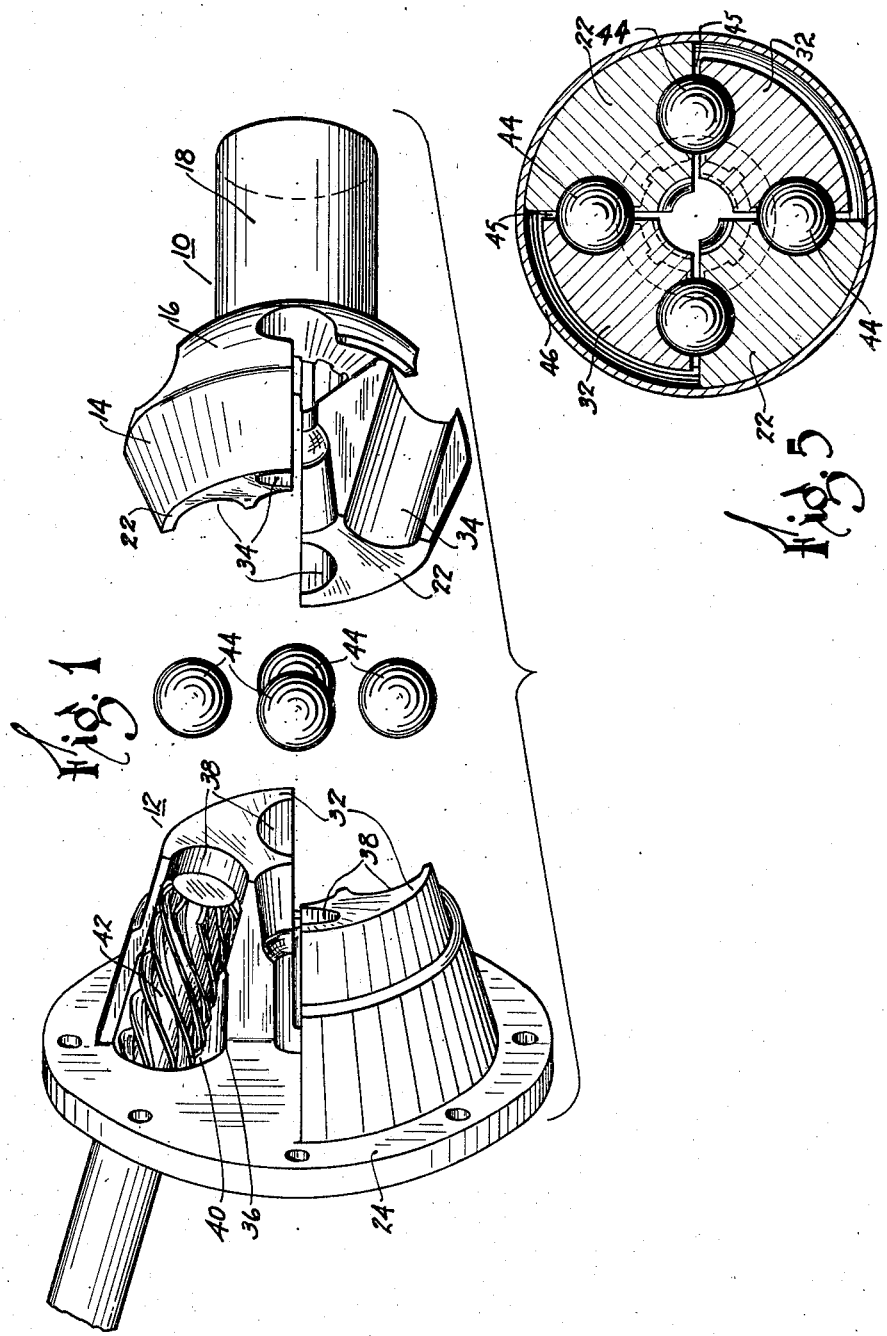
INVENTOR.
Carl W. Weiss
BY
ATTORNEY.

Sept. 22, 1936.  C. W. WEISS  2,055,421
UNIVERSAL JOINT
Filed May 2, 1934  2 Sheets-Sheet 2
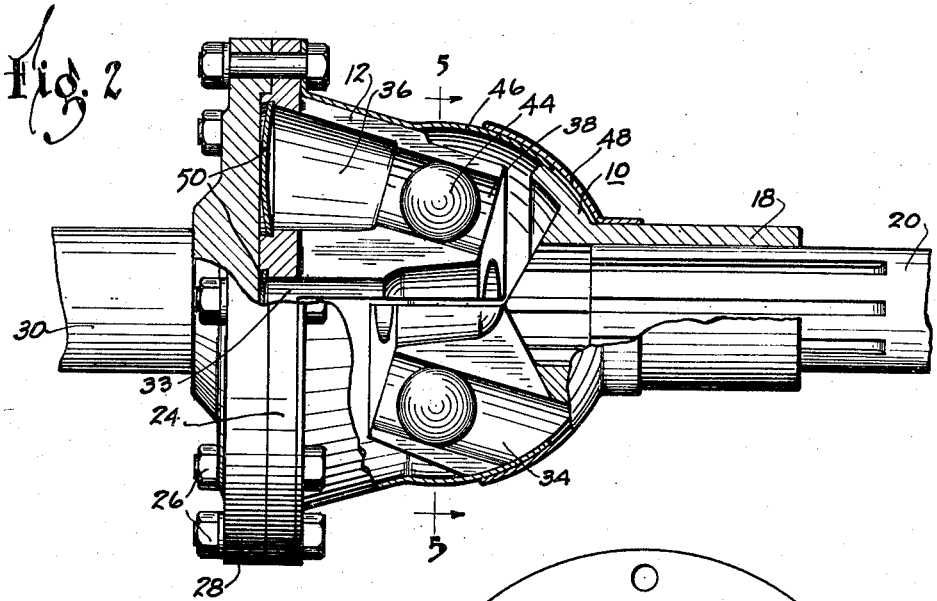
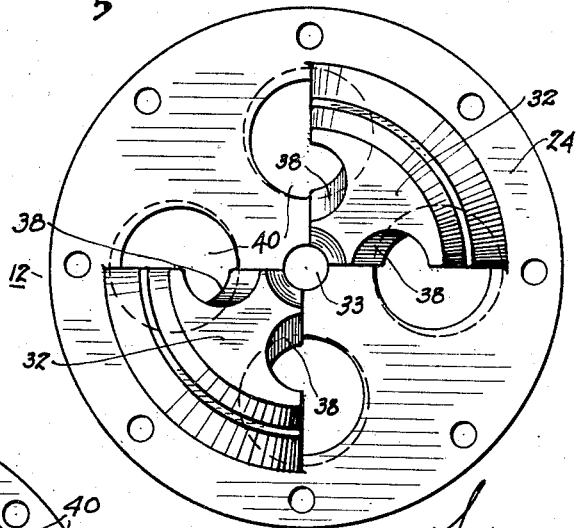
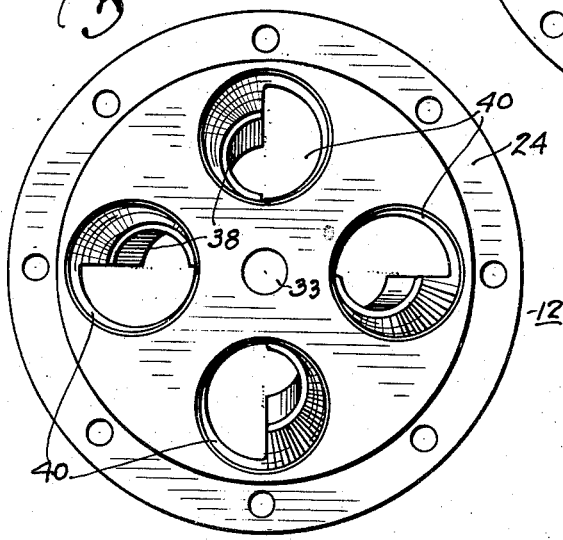
INVENTOR.
Carl W. Weiss
BY J. Q. McCrady,
ATTORNEY.

Patented Sept. 22, 1936

2,055,421

UNITED STATES PATENT OFFICE 2,055,421

UNIVERSAL JOINT

Carl W. Weiss, Brooklyn, N. Y.

Application May 2, 1934, Serial No. 723,548

10 Claims. (Cl. 64—21)

This invention relates to improvements in universal joints of the constant angular velocity type, and is illustrated as embodied in a joint intended for use in the final drive of an automobile.

The present invention is herein described as embodied in an angular-velocity joint of the type comprising two main members capable of relative angular displacement and having co-acting portions with proximate faces formed with ball races with their longitudinal axes intersecting at an angle. A bearing member such as a ball is received partly in each of two cooperating races and transmits force from one coacting portion to the other, the ball lying always in a plane which bisects the angle between the axes of the two main members, so that the angular velocity of the driving member is transmitted without fluctuation to the driven member.

In the illustrated joint, one of the main members is provided with a shank portion for receiving one of the shafts to be connected by the joint. The other main member has no shank but instead is provided with a flange adapted to be secured to a cooperating flange which is fixed to the other shaft.

An object of the invention is to produce a universal joint, preferably of the type described, in which the major elements may be cast or forged and in which the machining work required to finish the joint may be kept to a minimum.

Another object of this invention is to produce a universal joint of the type herein disclosed which may be manufactured at a cost materially less than was heretofore possible.

Another object of the invention is to produce a universal joint having a flange formed integral with one of the members of the joint to facilitate assembling the joint with the shaft with which it cooperates.

An important object of the invention is to produce a universal joint in which the ball races may be machined straight through the flange by any desired method such as milling, boring, broaching or reaming.

A further object of the invention is to produce a universal joint which may be assembled complete, packed with lubricant and sealed up permanently before leaving the factory.

Other objects and advantages of the present invention will be apparent from the following detailed description and from the illustrative embodiment of the invention in the accompanying drawings which are intended merely for illustrative purposes and are not intended to define the scope of the invention, reference being had for that purpose to the subjoined claims.

In the drawings, wherein similar reference characters refer to similar parts throughout the several views:

Figure 1 is an exploded view showing the various elements of the joint, and showing a milling cutter in place to finish one of the ball races;

Figure 2 is an elevation, partly in section, showing the assembled joint;

Figure 3 is an end elevation of the flanged member, as viewed from the right in Figure 1;

Figure 4 is another view of the flanged member, as viewed from the left in Figure 1; and Figure 5 is a sectional view taken on the line 5—5 of Figure 2.

Referring more particularly to Figures 1 and 2 there is shown a universal joint having two main members 10 and 12 designed to move angularly relative to each other, the joint illustrated being of the general type covered by my prior Patent No. 1,522,351, granted January 6, 1925.

The member 10, in the arrangement illustrated, comprises a body section 14 having a spherical outer surface 16, and a hollow shank 18 which is internally grooved to provide a splined connection between the shank member 10 and a shaft 20. The body section 14 is shown cut away to form two laterally extending arms 22 symmetrically disposed with reference to the axis of the member 10 so that equal recesses are formed therebetween.

The member 12 is of the general shape of the frustum of a cone, and is provided with a flange 24 preferably formed integral therewith and drilled at its outer periphery to receive fastening means 26 which fix the member 12 to a cooperating flange 28 carried by a shaft 30 which may be either the driving or the driven member, depending on where the joint is employed. The body section 12 is cut away to form two laterally extending arms 32, symmetrically disposed with reference to the axis of the member 12 so that equal recesses are formed therebetween to receive the cooperating arms 22 of the member 10. An axial bore 33 extends through the member 12 and flange 24, and facilitates securing the member during machining and repair.

In manufacturing the member 10, the opposite faces of arms 22 are cast or forged with grooves inclined to the axis of the member 10, and diverging from a point preferably in front of the spherical outer surface 16. The only machining work required to finish the member 10 of the joint is to clean out the internal splines of the hollow shank 18, and to remove a thin layer of metal from the grooves in the faces of arms 22 to form ball races 34. These ball races may be formed in any desired manner such as that disclosed in my copending application Serial No. 699,305, filed November 23, 1933.

The member 12, having a flange which may be formed integral with the body section, may be economically manufactured by either casting or forging the member with grooves 36 formed in the opposite faces of arms 32, inclined to the axis of the member 12 and diverging from a point preferably in front of the frustum of the cone. Ball races 38 are formed in the grooves 36 of arms 32 by removing a thin layer of metal from the surface of the grooves. This may be accomplished by any desired method such as milling, boring, broaching or reaming or by the same device as suggested for finishing the ball races of the member 10.

In order to manufacture member 12 economically it is desirable to be able to finish more than one ball race at a time. Since grooves 36 diverge in front of the member 12 it is necessary to pass the cutter through the flange 24 in order to finish the ball races 38 carried in the end of the grooves 36. According to one feature of the invention, the grooves 36 are therefore prolonged to form apertures 40 which extend through the flange 24 so that the milling cutter 42 employed to finish ball races 38 may be passed through member 12 in the manner illustrated in Figure 1. It is thus possible to finish the ball races of members 10 and 12 in the same manner using the same machine for both members. It will be noted that the cutter only contacts the ball race area since the groove 36 is deeper than the finished race, so that the amount of metal to be removed in finishing the ball races may be kept to a minimum.

To assemble the joint the arms 22 of member 10 are placed in the recesses formed between the arms 32 of the member 12 and a ball 44 is placed between each pair of cooperating ball races of the two members. Since the diverging angles of the ball races 34 and 38 are equal the balls always lie in a plane which bisects the angle between the axes of the two main members.

To permit angular displacement between the two members a clearance is provided between arms 22 and 32 as indicated at 45 in Figure 5.

Member 12 is provided with a casing or shield 46 fixed to flange 24 and extending down over said member to a point adjacent the ball race 38, from which point it is formed spherical to correspond to the curvature of the spherical outer surface 16 of member 10. Member 10 is provided with a cooperating shield 48 fixed to shank 18 and having a spherical portion overlapping shield 46. The joint is thus completely closed circumferentially to prevent the admission of dust and dirt, and also to provide a means for retaining lubricant within the joint.

The apertures 40 and bore 33 extending through flange 24 may be closed in any desired manner such as by means of Welch plugs 50 as shown in Figure 2. The apertures may be closed individually, as shown, or one large plug may be employed to close all the apertures. These plugs form a permanent seal and need not be removed, since they are countersunk below the surface of flange 24 and therefore do not disturb the fit of the matching flanges 24 and 28. It is therefore possible to pack the joint with lubricant and assemble it before leaving the factory. Any conventional means may be employed to lubricate the joint periodically after a given amount of service.

While several illustrative embodiments have been described in detail, it is not my intention to limit the scope of the invention to those particular embodiments, or otherwise than by the terms of the appended claims.

I claim:

1. A universal joint comprising a body member having a flanged base, an arm formed integral with the base, a groove formed in the arm and extending through the base, one portion of the groove being of suitable diameter to form a bearing surface, the remainder of the groove being of greater diameter to permit machining of the second portion without interference by said remainder.

2. A universal joint comprising a body member having a flanged base, an arm formed integral with the base, a groove formed in the arm and extending through the base, the arm portion of the groove being of suitable diameter to form a bearing surface, the flanged base portion of the groove being of greater diameter to permit machining of the arm portion without interference by said flanged base portion.

3. In a universal joint comprising two main members, a plurality of equally spaced arms carried by each of said members, a flange formed on one of the members, a splined sleeve carried by the other member, inclined grooves extending entirely across the faces of said arms and forming apertures through said flange and in line with said grooves to facilitate finishing of said grooves by permitting the finishing means to pass entirely through the flanged member, and balls engaged in the grooves for transmitting motion from one main member to the other.

4. In a universal joint having two main members, interfitting arms on each of said members, rectilinear intersecting grooves across the adjacent faces of the arms, a ball at the intersection of each pair of grooves, a flange formed integral with one of said members, means carried by the other of said members for receiving a shaft, apertures through said flange and in line with said grooves to receive forming means for finishing said grooves, and means for closing said apertures.

5. A universal joint having two relatively movable main members, a plurality of equally spaced arms carried by each of said members, intersecting grooves across the adjacent faces of the arms, a ball at the intersection of each pair of grooves, a flange on one of the members, apertures through the flange in line with said grooves, said grooves being machined to form ball races, slidably interengaging spherical casing members fixed to each of said members, and means additional to said casing members to prevent the escape of lubricant after the joint is assembled.

6. A universal joint comprising two main members, a plurality of cooperating arms on said members, rectilinear intersecting grooves across the adjacent faces of the arms, a portion of each of said grooves being of lesser diameter than another portion, the portion of lesser diameter being formed with a smooth surface, and a ball at the intersection of each pair of grooves.

7. In combination, a universal joint body member, a cooperating shaft therefor, means carried by the body member for connecting the body member to the shaft, and grooves formed in the body member and extending through the same, a portion of each of said grooves being of lesser diameter than the remainder.

8. In a universal joint assembly adapted to interconnect a pair of shafts, a pair of body members, a plurality of arms carried by each of the body members, longitudinally extending grooves formed in opposite faces of each arm, means including a flange fixed to one of the body members to connect said body member to one of the shafts, and means including apertures of larger diameter than the grooves passing through the flange in line with the grooves to facilitate finishing a portion of said grooves.

9. In a universal joint a body member, a plurality of arms carried by the body member, longitudinally extending grooves formed in opposite faces of each arm, a flange fixed to the body member, and means including apertures of larger diameter than the grooves passing through the flange in line with the grooves to facilitate finishing a portion of said grooves.

10. In a universal joint, a body member, a plurality of arms carried by the body member, longitudinally extending grooves formed in opposite faces of each arm, a portion of said grooves being of lesser diameter than another portion, and means to finish the portion of lesser diameter of each groove by passing a cutting element longitudinally with respect to the grooves to form smooth surfaces.

CARL W. WEISS.